United States Patent [19]

Takaguchi

[11] Patent Number: 5,062,752
[45] Date of Patent: Nov. 5, 1991

[54] CONTAINER COUPLING DEVICE

[75] Inventor: Hiroyuki Takaguchi, Nagasaki, Japan

[73] Assignee: Taiyo Seiki Iron Works Co., Ltd., Osaka, Japan

[21] Appl. No.: 415,229

[22] PCT Filed: Jan. 30, 1989

[86] PCT No.: PCT/JP89/00096
§ 371 Date: Sep. 15, 1989
§ 102(e) Date: Sep. 15, 1989

[87] PCT Pub. No.: WO89/07079
PCT Pub. Date: Aug. 10, 1989

[30] Foreign Application Priority Data

Feb. 4, 1988 [JP] Japan .................................. 63-25452

[51] Int. Cl.⁵ ............................................ F16B 21/00
[52] U.S. Cl. ................................ 411/347; 411/552; 24/287
[58] Field of Search ............... 411/552, 340, 549, 347, 411/553, 341, 342, 343, 344, 345, 354, 548, 349; 24/453, 287, 590; 410/81, 82, 83, 78; 220/1.5; 206/159

[56] References Cited

U.S. PATENT DOCUMENTS

| | | | |
|---|---|---|---|
| 2,364,288 | 12/1944 | Haggerty | 411/347 |
| 2,503,305 | 4/1950 | Storer | 411/549 |
| 2,972,175 | 2/1961 | Abolins | 24/287 |
| 3,568,263 | 3/1971 | Meehan | 411/553 X |
| 3,691,595 | 9/1972 | Backteman et al. | 24/287 |
| 3,718,218 | 2/1973 | Shields | 410/78 X |
| 3,753,272 | 8/1973 | Laidley | 24/287 |
| 3,933,390 | 1/1976 | Barrett et al. | 411/347 X |
| 4,293,984 | 10/1981 | Kaufmann, Jr. | 411/553 |
| 4,782,561 | 11/1988 | Hayama | 24/287 |
| 4,827,609 | 5/1989 | Kawecki | 411/553 |

FOREIGN PATENT DOCUMENTS

| | | | |
|---|---|---|---|
| 3642399 | 6/1988 | Fed. Rep. of Germany | 410/82 |
| 59-121395 | 8/1984 | Japan . | |
| 61-104986 | 5/1985 | Japan . | |
| 61-142185 | 6/1986 | Japan . | |
| 61-103388 | 7/1986 | Japan . | |
| 1216610 | 12/1970 | United Kingdom | 411/549 |

Primary Examiner—Rodney M. Lindsey
Attorney, Agent, or Firm—Wendertoth, Lind & Ponack

[57] ABSTRACT

A container coupling device is disclosed for coupling upper and lower containers together in a simple and reliable manner to allow for reliable transport of stacked containers. The container coupling device includes a rotation restriction mechanism provided between a lower insertion shank and a lower engaging body. The lower engaging body is formed on upper and lower sides with tapered surfaces. A rotary shaft has a spring to bias the lower engaging body in a locking direction. The rotation restriction mechanism serves to temporarily prevent the lower engaging body from turning in the locking direction. This rotation restriction action can be released by additional turning torque in the locking direction. Such torque is produced when the upper or lower tapered surfaces engage with an engaging hole in the container. Upon release of the restriction mechanism, the spring will turn the lower engaging body toward the locking position. After the coupling device is engaged in the bottom of a container, the engaging body is lowered into an engaging hole in a lower container. The engaging body automatically turns toward the locking position to couple the containers together. To disconnect the containers, the lever is turned back to where the turn restriction mechanism becomes operative, and the upper container is lifted. When the upper tapered surfaces engage the engaging hole, the lower engaging body will align with the insertion shanks to allow extraction of the coupling device from the engaging hole.

18 Claims, 2 Drawing Sheets

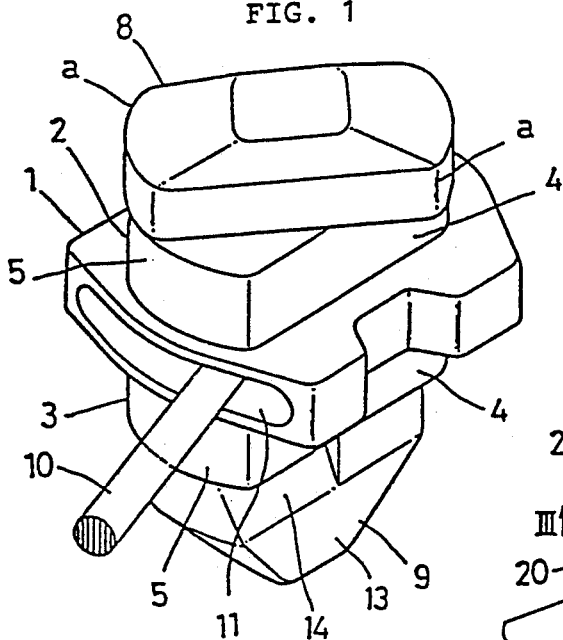
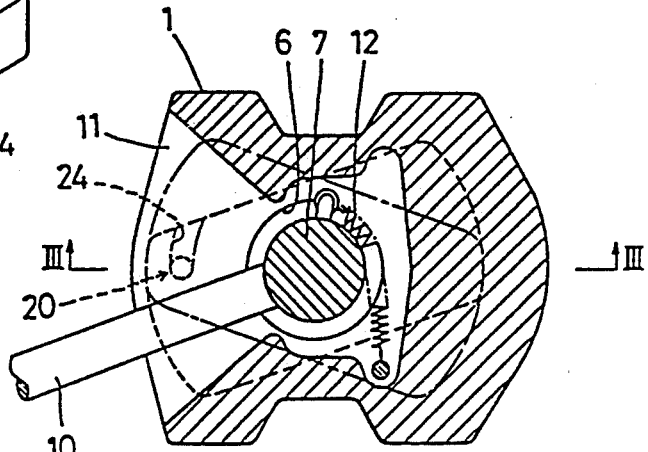
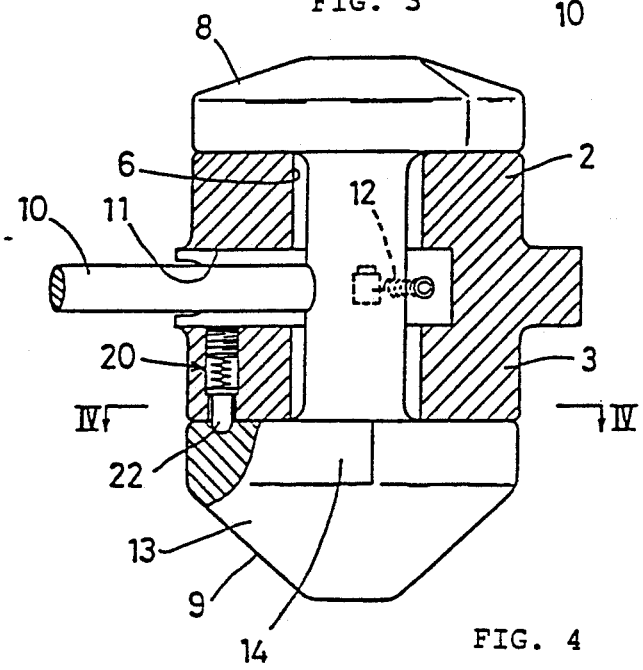
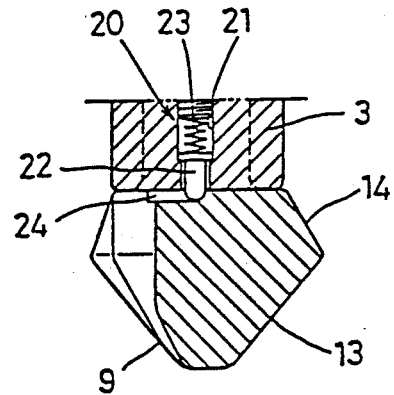
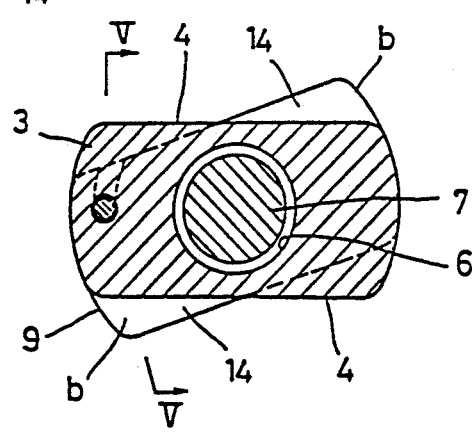
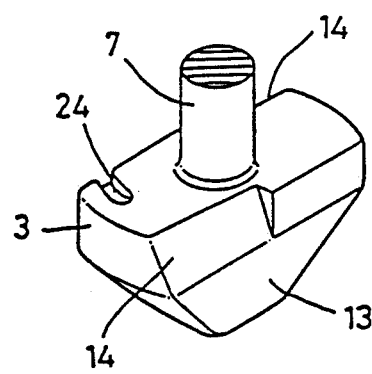

CONTAINER COUPLING DEVICE

TECHNICAL FIELD

The present invention relates to a container coupling device for coupling containers piled one upon another.

BACKGROUND ART

It is a common practice to transport by ship a lot of containers put one upon another in a plurality of tiers. If containers are simply piled one upon another, they may fall owing to the rolling of ship. To prevent the fall of containers, upper and lower containers are usually coupled together by use of coupling devices.

As one example of such prior art coupling devices, there is known one which comprises a body having an upper portion adapted to be detachably fitted in an engaging hole formed in a bottom corner of the upper container, an insertion shank provided on the underside of the body and insertable into an engaging hole formed in a top corner of the lower container, and an engaging body provided on the underside of the insertion shank. After inserting the insertion shank into the engaging hole, the engaging body is provided to bring both ends of the engaging body, which protrude outwardly from both sides of the insertion shank, into engagement with the peripheral wall of an opening at the lower side of the engaging hole.

With this coupling device, a shaft provided on the top surface of the engaging body is inserted into an insertion hole formed in the body of the coupling device, a lever coupled to the shaft is inserted in a lever insertion hole opening to one side of the body of the coupling device and elongated in the transverse direction, and then the engaging body is pivoted by controlling the lever. This means that the lever has to be necessarily turned when coupling the upper and lower containers together. Thus the coupling of containers was an extremely troublesome task.

Moreover, there is a fear that the engaging body, which is held in an engaged position, might pivot to a disengaged position owing to rolling and vibration during transportation. Thus the reliability of coupling is low.

SUMMARY OF THE INVENTION

It is therefore an object of the present invention to provide a container coupling device which obviates the above-mentioned shortcomings and which makes it possible to couple upper and lower containers together easily by dropping the lower portion of the coupling device into an engaging hole formed in the lower container with the upper portion of the coupling device engaged in an engaging hole formed in the upper container.

In order to attain the above object, with the coupling device according to the present invention, there is provided a lever-operated turn restrictor mechanism which serves to lock an engaging body provided on the bottom surface of an insertion shank in such a position that both of its sides, at the rear portion thereof with respect to the direction of rotation toward a locking position, protrude from both sides of the insertion shank and to release the above-mentioned locking action when a turning torque in a locking direction acts on the engaging body. The engaging body is formed with tapered surfaces on both sides thereof at the upper rear portion with, respect to the direction of rotation toward the locking position and at the lower portion. A spring is mounted in the body of the coupling device to turn the engaging body toward the locking direction.

To couple together the containers piled one upon another, the body of the coupling device is mounted to the upper container suspended from a crane or the like by engaging its upper portion in an engaging hole formed in a bottom corner of the container. Then the container is lowered onto the lower container placed in position beforehand so as to let the engaging body drop into an engaging hole formed in the lower container. Thus by the abutment between the inner periphery of the engaging hole and the tapered surfaces formed on the lower part of the engaging body, a turning torque in the locking direction will be imparted to the engaging body. The locking action will be released by the turning torque, thus allowing the engaging body to turn in the locking direction biased by the spring. Thus the engaging body will be brought into engagement at both longitudinal ends thereof with the peripheral portion of the bottom of the engaging hole.

Thus, both upper and lower engaging bodies are provided and are fixed together by a shaft for rotation therewith. A lever is fixed to and extends radially outwardly from the shaft to allow for rotation to be imparted to the upper and lower engaging bodies.

According to the present invention, after engaging the body of the coupling device to each bottom corner of the upper container, the upper container is lowered to let the lower engaging body and the lower insertion shank drop into the engaging hole in the lower container. By the engagement between the inner periphery of the engaging hole in the container and the tapered surfaces on the lower engaging body, the lower engaging body will turn while releasing the locking action. Thus the lower engaging body will pivot biased by the spring so that its both end portions will engage the edge of the opening of the engaging hole in the lower container. Thus the upper and lower containers can be coupled together relatively easily.

Since the lower engaging body is maintained in an engaged state by the resilience of the spring, the containers can be coupled with high reliability and safety.

BRIEF DESCRIPTION OF THE DRAWINGS

FIG. 1 is a perspective view of an embodiment of the coupling device according to the present invention;

FIG. 2 is a cross-sectional plan view of the device shown in FIG. 1;

FIG. 3 is a sectional view taken along line III—III of FIG. 2;

FIG. 4 is a sectional view taken along line IV—IV of FIG. 3;

FIG. 5 is a sectional view taken along line V—V of FIG. 4;

FIG. 6 is a perspective view of the lower engaging body of the device shown in FIG. 1;

DETAILED DESCRIPTION OF THE INVENTION

Now the embodiments of the present invention will be described with reference to the accompanying drawings.

As shown in FIGS. 1 and 2, a body 1 of the coupling device has flat top and bottom surfaces, and an upper insertion shank 2 and a lower insertion shank 3 are provided on the top and bottom surfaces, respectively.

Figure 9:
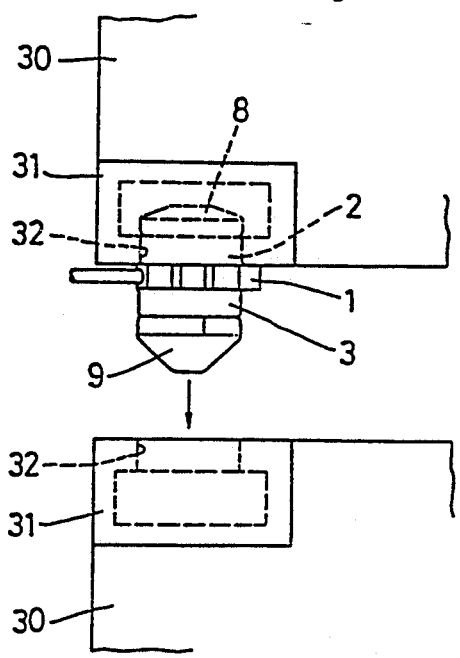
FIGS. 9 and 10 are plan views showing in steps how the containers are coupled together.
Figure 10:
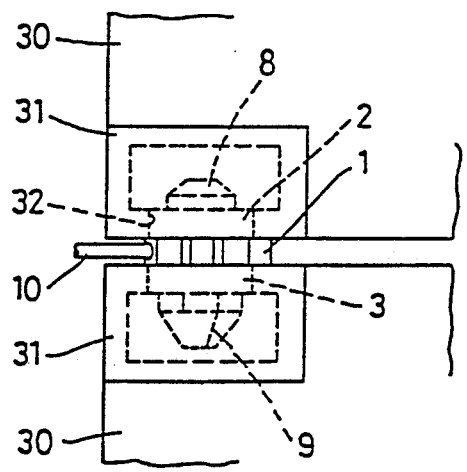

The upper insertion shank 2 and the lower insertion shank 3 have both sides thereof formed into flat guide surfaces 4 and both ends thereof formed into arcuate surfaces 5 so as to correspond to the shape of engaging holes 32 formed in corner fittings 31 of containers 30 shown in FIGS. 9 and 10. The distance between the guide surfaces 4 at both sides is shorter than the distance between the arcuate surfaces 5 at both ends.

Figure 7:
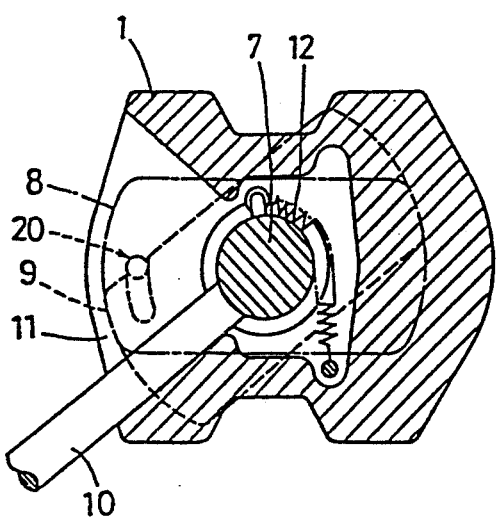
FIGS. 7 and 8 are cross-sectional views of the device in FIG. 1 showing different operational positions.

An upper engaging body 8 and a lower engaging body 9 are adapted to be pivoted by a lever 10 provided at an intermediate portion of a shaft 7 which extends through a hole 6 formed vertically through the body 1, and the upper and lower insertion shanks. The lever 10 extends through a lever insertion hole 11 which opens to one side of the body 1 of the coupling device and is elongated in the transverse direction. With the lever 10 turned until it abuts one end of the lever insertion hole 11, the upper engaging body 8 is located within the perimeter of the upper insertion shank 2. In this state, as shown in FIG. 7, the lower engaging body 9 is positioned so that both of its sides at their respective front portions with respect to the direction of rotation will protrude outwardly beyond the guide surfaces 4 of the lower insertion shank 3.

Figure 8:
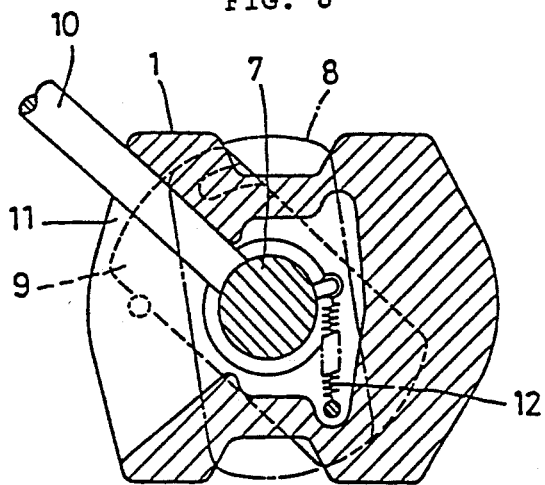

With the lever 10 in abutment with the other end of the lever insertion hole 11, as shown in FIG. 8, the upper engaging body 8 and the lower engaging body 9 will be positioned so as to have both end portions thereof protruding from both sides of the insertion shanks 2 and 3 opposite the engaging bodies 8 and 9, respectively. The coupling device is now in the locked state.

Between the lower insertion shank 3 and the lower engaging body 9, there is provided a turn restrictor mechanism 20 to prevent the lower engaging body 9 from turning, in the locking direction beyond the point where both of its sides at their respective rear end portions with respect to the direction of rotation toward the locking position protrude slightly from both sides of the lower insertion shank 3 (see FIG. 4). Also there is provided a spring 12 in the body 1 of the coupling device. It is adapted to impart a burning torque to the rotary shaft 7 so that it will turn in such a direction as to put the restrictor mechanism 20 into action, i.e. such a direction as to turn the lower engaging body 9 toward the locking position.

As shown in FIG. 5, the restrictor mechanism 20 comprises a round-headed engaging pin 22 and a spring 23 biasing the engaging pin 22 downwardly and is mounted in a pin hole 21 formed in the bottom surface of the lower insertion shank 3. The engaging pin 22 is received in an engaging recess 24 formed in the top surface of the lower engaging body 9. The turning of the lower engaging body 9 is restricted by the engagement between the engaging recess 24 and the engaging pin 22. They are held in engagement with each other with a force larger than the burning force of the spring 12 for burning the shaft 7 in the locking direction. If an additional turning torque acts on the lower engaging body 9 in the locking direction in the engaged state of engaging pin 22, the locking action of the restrictor mechanism 20 will be removed.

The construction and the mounting position of the restrictor mechanism 20 are not limited to those shown in the embodiment. For example, the spherical head of the spring-biased engaging pin may be brought into engagement with the lever 10. Also, the engaging pin may be brought into engagement with a projection formed on the outer periphery of the shaft 7.

As shown in FIGS. 5 and 6, the lower engaging body 9 is formed on both sides thereof with tapered surfaces 13 and 14 at the lower portion and at the upper rear (with respect to the direction of rotation toward the locking position) portion, respectively.

The lower engaging body 9 may be formed on both sides thereof over its entire upper portion with tapered surfaces 14.

When coupling upper and lower containers together by use of the coupling device shown in the embodiment, the body 1 of the coupling device is secured to an upper container suspended from a crane by engaging its upper portion in an engaging hole formed in the bottom corner of the container. The container is then lowered so that the lower insertion shank 3 will drop into an engaging hole formed in a top corner of a lower container.

To couple the body 1 of the coupling device with the upper container, the lever 10 is turned until it abuts one end of the lever insertion hole 11 as shown in FIG. 7. With the upper engaging body 8 kept within the perimeter of the top surface of the upper insertion shank 2, the latter is inserted into the engaging hole 32 formed in the bottom face of the upper container 30 shown in FIG. 9. Then with the top of the body 1 of the coupling device abutting the bottom of the upper container 30, the lever 10 is released.

By releasing it, the shaft 7 will turn under the bias of the spring 12. When, as shown in FIG. 5, the engaging pin 22 comes into engagement at its tip with the end of the engaging recess 24, the lever 10 will stop. In this state, the upper engaging body 8, which rotates together with the lever 10, will be protruding at its corners a beyond the guide surfaces 4 of the upper insertion shank 2, so that it will come into engagement at its diagonally opposite corner portions a with the edge of an upper opening of the engaging hole 32 in the container. The coupling device is secured in position by this engagement.

Also as shown in FIG. 4, the lower engaging body 9 has both sides thereof protruding at their respective rear ends b (with respect to the direction of rotation toward the locking position) from the guide surfaces 4 of the lower insertion shank 3.

In this state, the upper container 30 is lowered to let the lower engaging body 9 drop into the engaging hole 32 formed in the top corner of the lower container 30. Thus a turning torque will be imparted to the lower engaging body 9 to turn it toward the locking position by the engagement between the inner periphery of the engaging hole 32 and the lower tapered surfaces 13. The turn restrictor mechanism 20 will be made inoperative by the application of a turning torque. When the lower engaging body 9 is lowered to such a position as to pass through the engaging hole 32, it will turn toward the locking position biased by the spring 12 until as shown in FIG. 8 the lever 10 abuts the other end of the lever insertion hole 11.

As the lower engaging body 9 pivots, both ends thereof will protrude from the guide surfaces 4 of the lower insertion shank 3 so as to engage the peripheral portion of the lower opening of the engaging hole 32 in the container. As a result the upper and lower containers are coupled together.

As the lower engaging body 9 turns toward the locking position, the upper engaging body 8 turns in the same direction. But since the upper engaging body 8 is received deep in the engaging hole 32 in the upper container 30 to engage its peripheral surface, it will not disengage in any way.

To disconnect the containers 30 from each other, the lever 10 is turned toward one end of the lever insertion hole 11. When the restrictor mechanism 20 comes into action, the lever 10 will stop turning. The upper container 30 is lifted in this state.

When the restrictor mechanism 20 is in action, the lower engaging body 9 keeps both sides thereof protruding at their respective rear portions (with respect to the direction of rotation toward the locking direction) from the guide surfaces 4 of the lower insertion shank 3 as shown in FIG. 5. The upper container 30 is lifted in this state, so that the upper tapered surfaces 14 abut the inner periphery of the engaging hole 32. By further raising the upper container 30 from this state, the lower engaging body 9 will pivot toward the locking position owing to the engagement between the inner periphery of the engaging hole 23 and the upper tapered surfaces 14. This will release the locking action by the restrictor mechanism 20, thus allowing the lower engaging body 9 to get out of the engaging hole 32. The lower engaging body 9 will now turn toward the locking position, urged by the spring 12.

After disconnecting the upper and lower containers 30 from each other, the lever 10 is pivoted until it abuts one end of the lever insertion hole 11 so that the upper engaging body 8 is set within the perimeter of the top surface on the upper insertion shank 2. Then the body 1 of the coupling device is pulled down.

Figure 11:
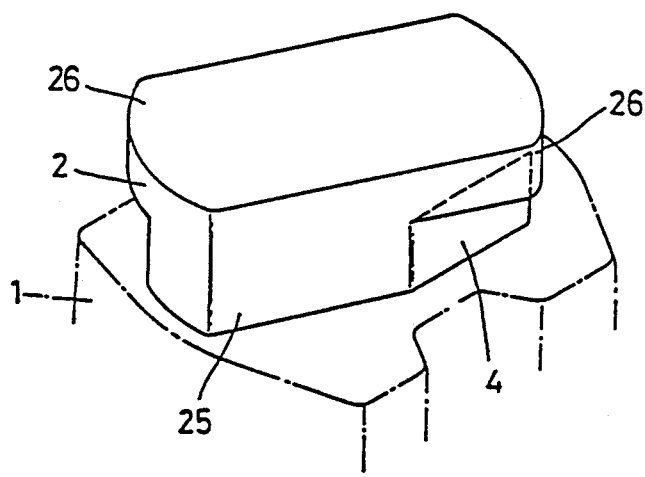
FIG. 11 is a perspective view of another embodiment.
Figure 12:
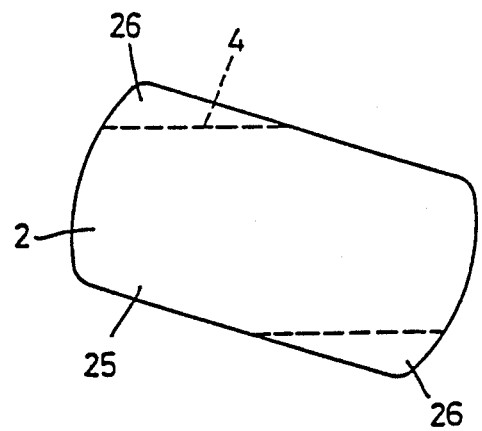
FIG. 12 is a plan view of the embodiment of FIG. 11.

In the embodiment of FIGS. 1–10, the upper engaging body 8 is provided on top of the upper insertion shank 2 so that both ends of the upper engaging body 8 will engage the peripheral portion of the engaging hole 32 formed in the upper container 30 by pivoting the upper engaging body 8. As shown in FIGS. 11 and 12, the upper insertion shank 2' may be formed on both sides at diagonally opposite locations with bevelled faces 25 and provided with protrusions 26 at the upper part of the flat guide surfaces 4' so as to be continuous with the respective bevelled faces 25. In this arrangement, after inserting the upper insertion shank 2' in the engaging hole 32 in the upper container 30, the body 1' of the coupling device is pivoted until the guide surfaces 4' abut the inner periphery of the engaging hole 32 to bring the protrusions 26 into engagement with the peripheral portion of the opening of the engaging hole 32.

INDUSTRIAL APPLICATION

With the container coupling device according to the present invention, a plurality of containers piled one upon another for transportation can be coupled together easily and in a highly reliable manner. It can be advantageously used for container transportation by ship as well as by train.

What is claimed is:

1. A coupling device for coupling together containers such that the containers are maintained in a vertical stack, comprising:
    an upper portion adapted for engagement in an engaging hole in a bottom surface of an upper container;
    a horizontally elongated insertion shank mounted to said upper portion, said shank being rotatable about a vertical axis;
    a horizontally elongated engaging body, adapted for engagement in an engaging hole in a top surface of a lower container, mounted to a lower end of said upper portion for rotation about said vertical axis relative to said insertion shank, said engaging body having opposing side faces and a horizontal cross section which is substantially similar to a horizontal cross section of said insertion shank such that said elongated engaging body and said elongated insertion shank can be vertically aligned;
    a lever fixed for rotation with said engaging body;
    spring means for biasing said engaging body to rotate relative to said insertion shank toward a locking position wherein said engaging body and said insertion shank are misaligned such that portions of longitudinal ends of said engaging body protrude beyond a periphery of said insertion shank;
    rotation restriction means for restricting rotation toward said locking position of said engaging body relative to said insert shank such that a rotational torque in addition to that provided by said spring means is necessary to rotate said engaging body toward said locking position relative to said insertion shank beyond a predetermined point; and
    additional torque providing means for providing additional torque to cause said engaging body to automatically rotate relative to said insertion shank toward said locking position beyond said predetermined point upon insertion of said engaging body into the engaging hole in the top surface of the lower container.

2. A coupling device as recited in claim 1, wherein said additional torque providing means comprises upper and lower tapered portions on each side face of said engaging body, said tapered portions being adapted to contact a wall of the engaging hole in the top surface of the lower container and ride along the wall upon downward movement of said engaging body into the hole so as to force said engaging body to rotate.

3. A coupling device as recited in claim 1, wherein said rotation restriction means comprises an engaging recess formed in one of mutually adjacent faces of said insertion shank and said engaging body, and an engaging pin extending from the other of said mutually adjacent faces of said insertion shank and said engaging body for engagement in said engaging recess.

4. A coupling device as recited in claim 3, wherein said engaging pin is slidably extendable from said other of said mutually adjacent faces of said insertion shank and said engaging body; and
    said rotation restriction means includes biasing means for biasing said engaging pin toward said engaging recess.

5. A coupling device as recited in claim 3, wherein said one of said mutually adjacent faces of said insertion shank and said engaging body comprises an upper face of said engaging body; and said other of said mutually adjacent faces of said insertion shank and said lower engaging body comprises a lower face of said insertion shank.

6. A coupling device as recited in claim 1, wherein said lever comprises means for rotating said engaging body relative to said insertion shank.

7. A coupling device as recited in claim 1, wherein said engaging body defines as elongated lower engaging body; and said upper portion comprises an elongated upper engaging body and a shaft fixedly connecting said upper engaging body for rotation with said lower engaging body.

8. A coupling device as recited in claim 7, wherein said lever is fixed to and extends radially outwardly from said shaft.

9. A coupling device as recited in claim 7, wherein a longitudinal direction of said upper engaging body is vertically misaligned with respect to a longitudinal direction of said lower engaging body.

10. A coupling device for coupling together containers such that the containers are maintained in a vertical stack, comprising:

a body having a vertical hole formed therethrough;

a horizontally elongated upper insertion shank fixed to an upper surface of said body and having a vertical hole formed therethrough and aligned with said hole in said body;

a horizontally elongated lower insertion shank fixed to a lower surface of said body and having a vertical hole formed therethrough and aligned with said hole in said body and said hole in said upper insertion shank;

a shaft extending through said holes in said upper insertion shank, said body and said lower insertion shank, said shaft being rotatable about a vertical axis and substantially fixed against vertical movement relative to said upper insertion shank, said body and said lower insertion shank;

a horizontally elongated upper engaging body mounted above said upper insertion shank and fixed to an upper end of said shaft for rotation relative to said upper insertion shank, said upper engaging body having opposing side faces and being adapted for engagement in an engaging hole in a bottom surface of an upper container;

a horizontally elongated lower engaging body mounted below said lower insertion shank and fixed to a lower end of said shaft for rotation relative to said lower insertion shank, said lower engaging body being adapted for engagement in an engaging hole in a top surface of a lower container;

a lever fixed for rotation with said shaft;

spring means for biasing said shaft to rotate relative to said upper insertion shank, said body and said lower insertion shank toward a locking position wherein said lower engaging body and said lower insertion shank are misaligned and portions of longitudinal ends of said lower engaging body protrude beyond a periphery of said lower insertion shank; and rotation restriction means for restricting rotation toward said locking position of said shaft relative to said upper insertion shank, said body and said lower insertion shank such that a rotational torque in addition to that provided by said spring means is necessary to rotate said shaft toward said locking position relative to said upper insertion shank, said body and said lower insertion shank beyond a predetermined point.

11. A coupling device as recited in claim 10, further comprising additional torque providing means for providing torque to cause said shaft to automatically rotate relative to said upper insertion shank, said body and said lower insertion shank toward said locking position beyond said predetermined point upon insertion of said lower engaging body into the engaging hole in the top surface of the lower container.

12. A coupling device as recited in claim 11, wherein said additional torque providing means comprises upper and lower tapered portions on each side face of said lower engaging body, said tapered portions being adapted to contact a wall of the engaging hole in the top surface of the lower container and ride along the wall upon downward movement of said lower engaging body into the hole so as to force said shaft to rotate.

13. A coupling device as recited in claim 10, wherein said lower insertion shank has a bottom face and said lower engaging body has a top face, said bottom face of said lower insertion shank and said top face of said lower engaging body together defining mutually adjacent faces; and said rotation restriction means comprises an engaging recess formed in one of the mutually adjacent faces of said lower insertion shank and said lower engaging body, and an engaging pin extending from the other of said mutually adjacent faces of said lower insertion shank and said lower engaging body for engagement in said engaging recess.

14. A coupling device as recited in claim 13, wherein said engaging pin is slidably extendable from said other of said mutually adjacent faces of said lower insertion shank and said lower engaging body; and said rotation restriction means includes biasing means for biasing said engaging pin toward said engaging recess.

15. A coupling device as recited in claim 10, wherein said lever comprises means for rotating said upper and lower engaging bodies relative to said upper and lower insertion shanks, respectively.

16. A coupling device as recited in claim 10, wherein said lever is fixed to and extends radially outwardly from said shaft.

17. A coupling device as recited in claim 10, wherein a longitudinal direction of said upper engaging body is vertically misaligned with respect to a longitudinal direction of said lower engaging body.

18. A coupling device as recited in claim 10, wherein said spring means is further operable for biasing said shaft to rotate relative to said upper insertion shank, said body and said lower insertion shank toward a locking position wherein said upper engaging body and said upper insertion shank are misaligned such that portions of longitudinal ends of said upper engaging body protrude beyond a periphery of said upper insertion shank.

* * * * *